Sept. 18, 1928.

W. WRIGHT 1,685,039

PIPE HANGER ANCHOR AND THE LIKE

Filed Jan. 16, 1928

Inventor:
William Wright
By Thos. A. Tennis Jr.
Atty.

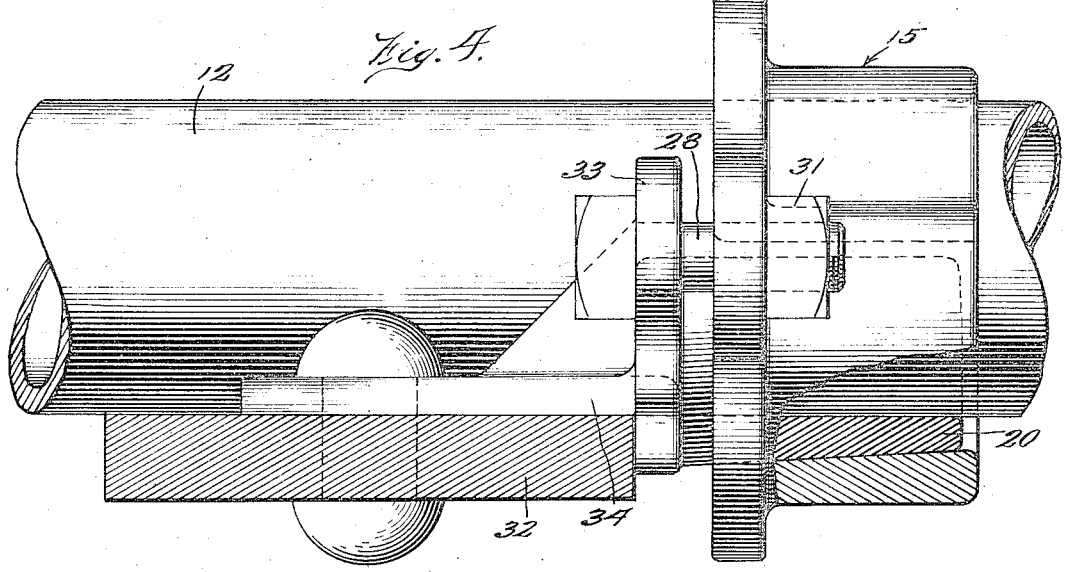
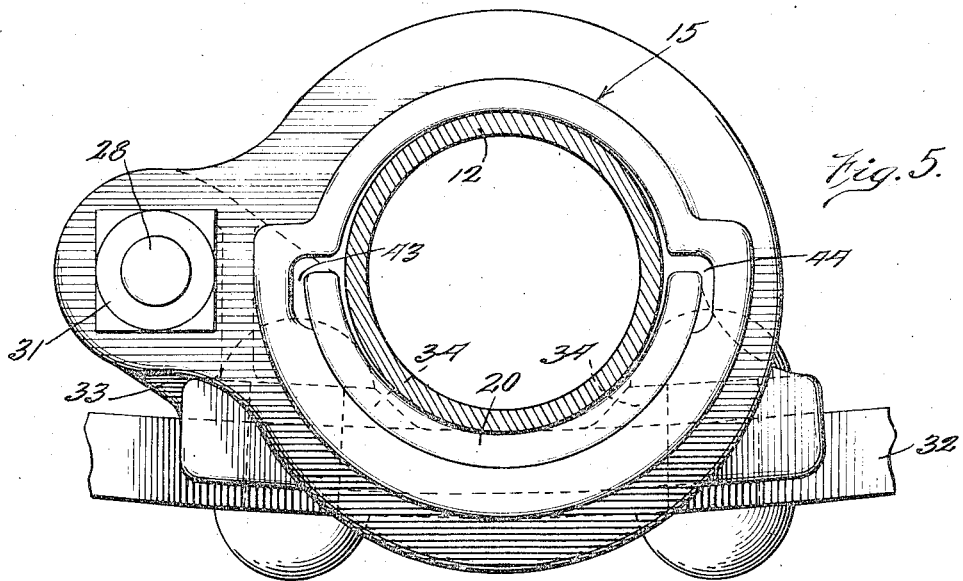

Sept. 18, 1928.  W. WRIGHT  1,685,039
PIPE HANGER ANCHOR AND THE LIKE
Filed Jan. 16, 1928    4 Sheets-Sheet 3
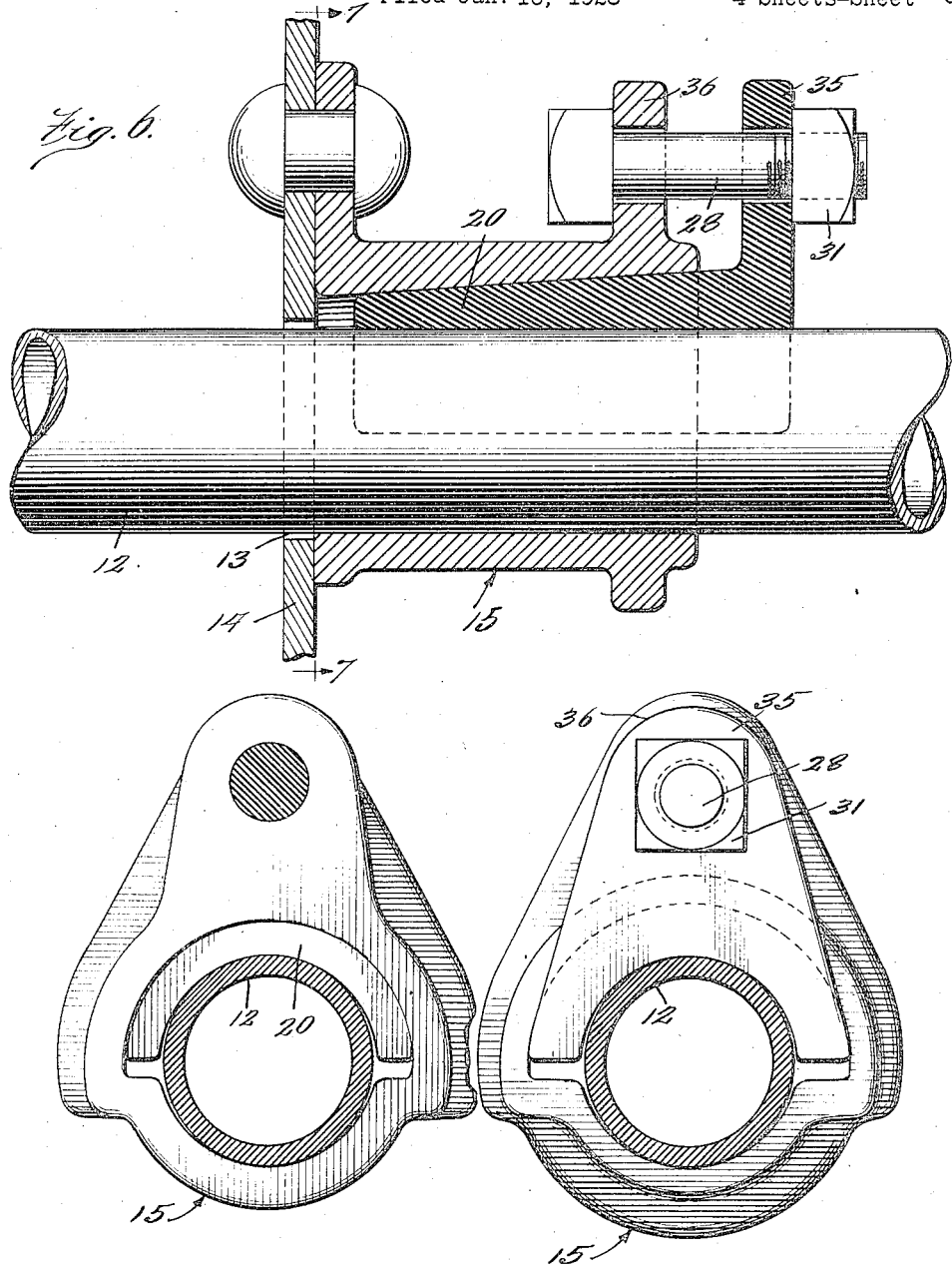

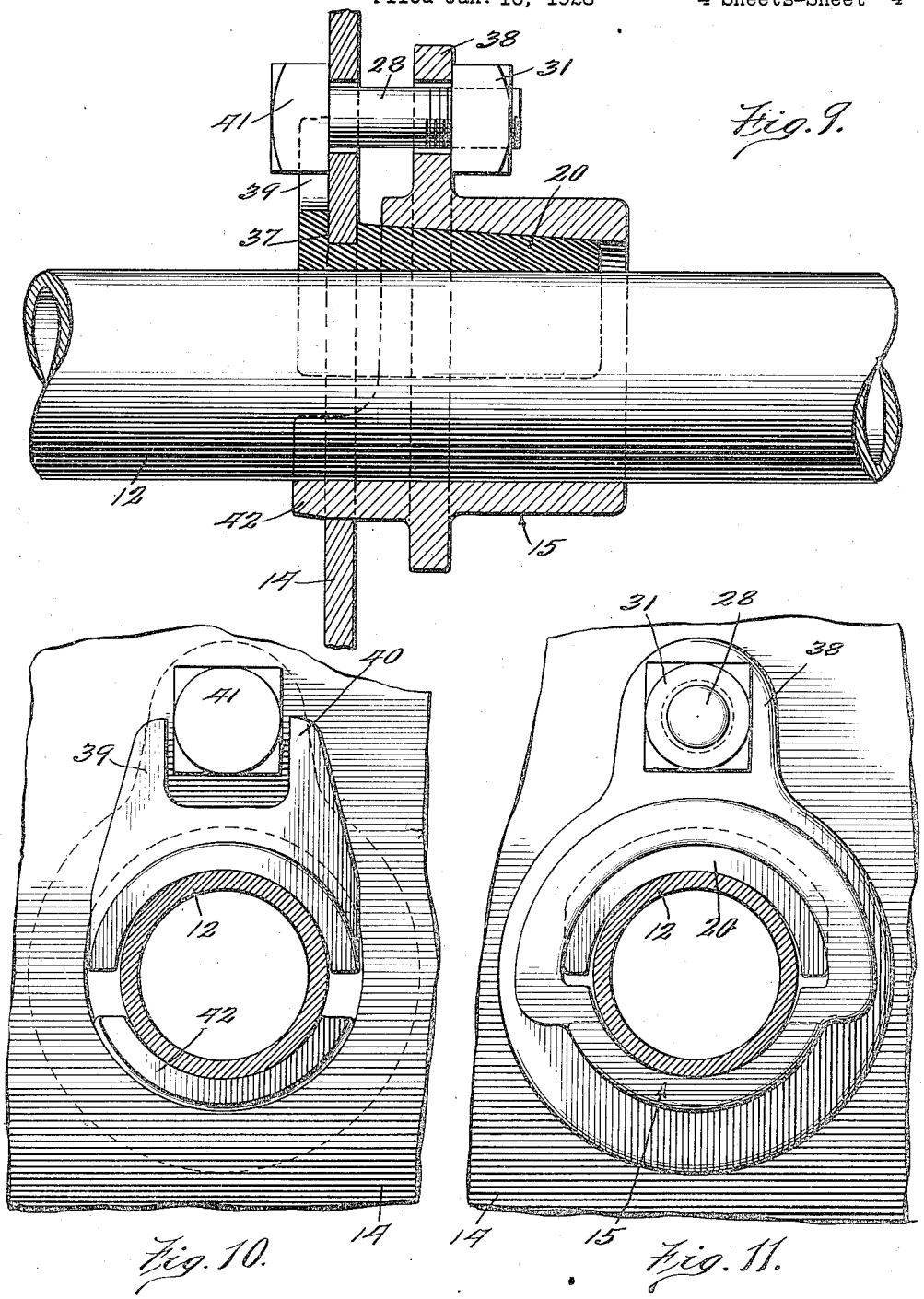

Patented Sept. 18, 1928.

1,685,039

UNITED STATES PATENT OFFICE.

WILLIAM WRIGHT, OF CHICAGO, ILLINOIS, ASSIGNOR TO MIDWAY RAILWAY EQUIPMENT CO., OF CHICAGO, ILLINOIS, A CORPORATION OF ILLINOIS.

PIPE-HANGER ANCHOR AND THE LIKE.

Application filed January 16, 1928. Serial No. 247,187.

This invention has to do with improvements in pipe hangers and anchors. The structures herein disclosed have been devised particularly for the purpose of supporting and hanging pipes used for heating oil and other liquids in tank cars and for supporting and hanging pipes used in other classes of railway work.

The main object of the invention is to provide a hanger and anchor of such construction as to provide effective support for those lengths of pipe extending lengthwise of the cars and which are subject to very severe strains lengthwise of the cars due to sudden starting and stopping of the trains.

In connection with the foregoing it is also an object to provide a hanger and anchor of such construction that the pipe is entirely surrounded by the anchor section, thus making it impossible for the pipe to fall away from the supporting device even if the latter should become loosened or not be drawn up solidly in the first place.

More specifically, it is an object of the invention to provide a supporting device including a circular collar section which encircles the pipe, together with arcuate wedge section of tapering size which may be forced lengthwise with respect to the pipe and be thus wedged between the collar and the pipe. Generally, also the collar section is provided with a companion recess or socket of tapered size to receive the wedge member so that when the latter is drawn up solid it will cooperate most effectively for the purpose of clamping the pipe in place.

Other objects and uses of the invention will appear from a detailed description of the same which consists in the features of construction and combinations of parts hereinafter described and claimed.

In the drawings:

Fig. 4 shows a side elevation of a modified construction of device;

Fig. 5 shows an end view corresponding to Fig. 4;

Fig. 6 shows a vertical section through another modified form of construction;

Fig. 7 shows a cross section on the line 7—7 of Fig. 6 looking in the direction of the arrows;

Fig. 8 shows an end view corresponding to Figs. 6 and 7 (looking in the opposite direction to that of Fig. 7);

Fig. 9 shows a longitudinal section through another modified form of construction in which the relationship between the collar and wedge sections has in some respects been reversed;

Fig. 10 shows a back face view of the construction in Fig. 9; and

Fig. 11 shows a front face view corresponding to Figs. 9 and 10 looking in the opposite direction to that of Fig. 10.

Figures 1, 2, 3:
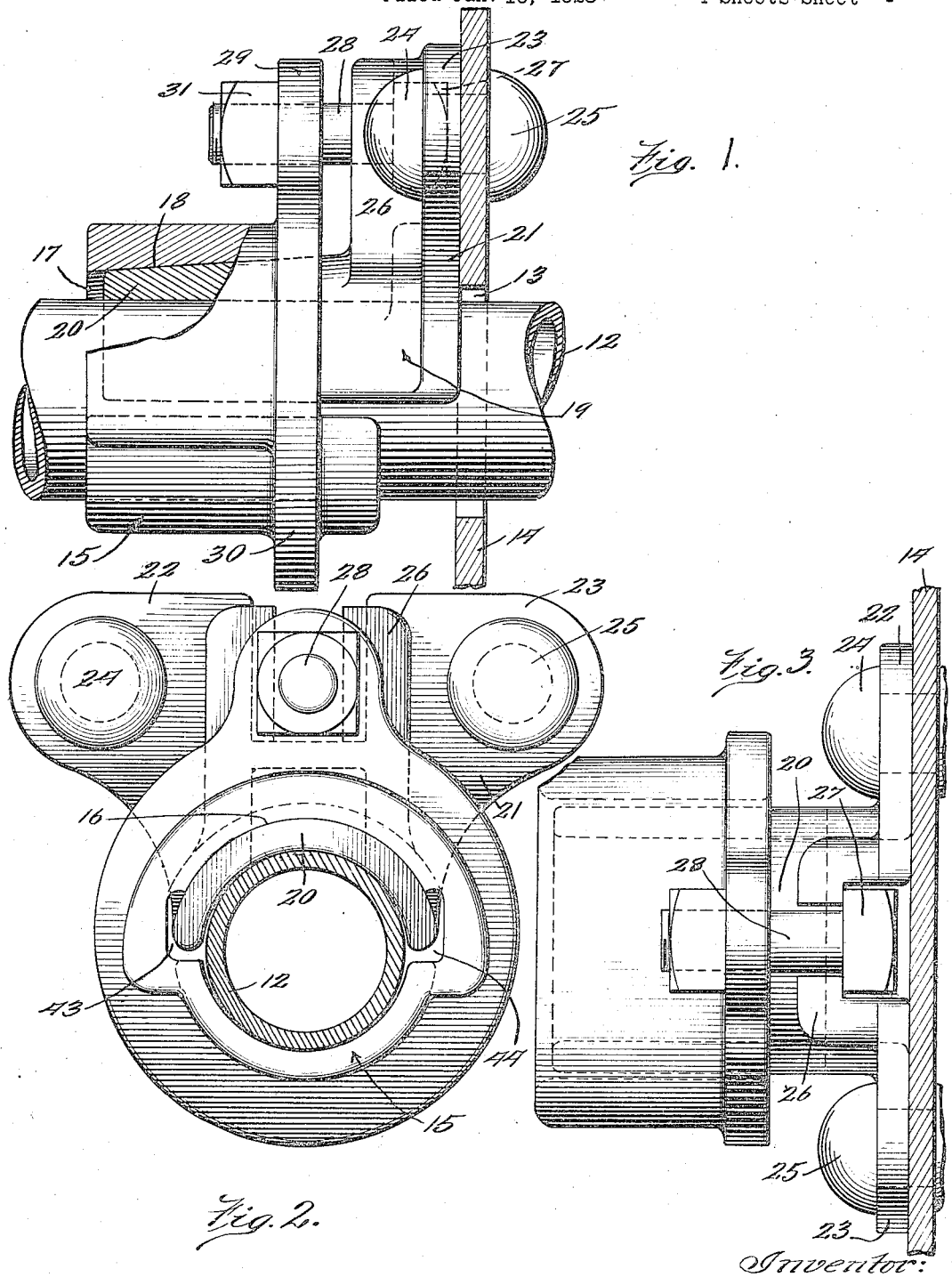
Figure 1 shows a side elevation of a device embodying the features of the present invention.
Fig. 2 shows an end view corresponding to Fig. 1.
Fig. 3 shows a top plan view corresponding to Figs. 1 and 2.

Referring first to the construction shown in Figs. 1, 2 and 3, I have therein shown a section of pipe 12 which is supported by the hanger and anchor member. Said pipe is shown as passing through an opening 13 in a fixed partition 14. The device of the present invention includes a collar member 15 the lower portion of which is formed on a curve substantially the same as or slightly larger than that of the pipe itself. The upper portion of this collar member 15 is formed on a curve of greater radius than the pipe as shown at 16 so as to establish a substantially semi-circular slotted opening 17 (see Fig. 1), between the upper portion of the pipe and the upper portion of the hanger. Furthermore, as will be evident from Fig. 1 the floor of the lower section of smaller radius extends parallel to the direction of the pipe itself, whereas the roof 18 of the upper portion of enlarged radius slants away from the upper portion of the pipe so that the slotted opening 17 is of wedge shape, being higher at the right hand side of Fig. 1 than at the left hand side thereof.

There is a wedge member 19 having a tapered and curved flange 20 which may be forced into the tapered slotted opening 17 already referred to. This wedge member 19 is also provided with an upstanding flange 21, which is adapted to seat squarely against the partition 14, and said flange 21 is provided with a pair of hanger ears 22 and 23 which may be secured to the partition in any convenient manner as by means of rivets 24 and 25.

The flange 21 is also preferably provided in its central portion with a vertically extending slotted enlargement 26 into which may be seated the head 27 of a tie bolt 28. This tie bolt reaches through a lug 29 extending upwards from the flange 30 on the end of the collar member 15 so that by tightening up a nut 31 on said bolt 28 the wedge member 19 is drawn solidly into the tapered slotted opening 17.

It will be seen from the foregoing that in order to effectively lock the anchor to the pipe 12 it is only necessary to tighten up the nut 31. It will also be seen that even in case the nut should become loosened the pipe will not be allowed to drop away from the hanger as long as the lug 29 remains on the bolt 28.

Referring to the modified construction shown in Figs. 4 and 5, the same differs from that just explained chiefly in the fact that it is intended for attachment to a horizontal support instead of a vertical support as in the previous case. This horizontal support comprises the cross bar 32 which for convenience is shown as being placed beneath the pipe 12. For a similar reason the collar 15 and tapered wedge 20 are reversed from the position shown in Figs. 1, 2 and 3, so that the wedge 20 is placed beneath the position of the pipe. Furthermore, in the present case the tie bolt 28 with its lock nut 31 are placed at the side of the structure, this arrangement being more convenient for use in some locations than the arrangement previously illustrated.

In the present case also, the bolt 28 passes through a lug 33 reaching upwards and sidewise from the flange 34 to which the tapered wedge 20 is connected.

Referring to the modified construction shown in Figs. 6, 7 and 8, in this case the taper of the slotted opening in the collar 15 has been reversed so that the thick portion of said taper lies further from the supporting plate 14 than the thin portion of the taper. This being the case the wedge 20 is drawn towards the supporting plate 14 in order to bring about the locking operation; and for this purpose the wedge member 20 is provided at its outer end with a lug 35 and the collar member 15 is also provided with a companion lug 36. The tie bolt 28, is then passed between these lugs so that said tie bolt may be made relatively short.

Referring to the modified construction shown in Figs. 9, 10 and 11, in this case the collar 15 is drawn towards the supporting plate 14 during the wedge operation, the tapered wedge 20 being retained stationary. In this respect this arrangement is somewhat similar to that of Figs. 1, 2 and 3. In the present case however, the tapered wedge member 20 is provided at its thick end with a groove or a slot 37 to receive the edge of the plate 14, the hole in the plate 14 being large enough to allow the wedge member to be set through it and then raised to bring said groove into engagement with the edge of the plate.

The tie bolt 28 passes through the plate 14 and through a lug 38 reaching upwardly from the collar member 15; and if desired the wedge member 20 may be provided on its back side with a pair of fingers 39 and 40 reaching upwardly high enough to engage the squared head 41 on the bolt 28 to prevent the same from turning.

In the present construction the collar member 15 is provided to a backwardly reaching lug 42 which extends through a lower portion of the hole in the plate 14 and thus establishes a bottom support for the collar member at the position of the plate.

Referring to Fig. 2 in particular it will be noted that the collar member is provided with undercuts or notches 43 and 44 at the positions where the side edges of the tapered wedge 20 are to be accommodated. These notches or relieves will prevent any binding of the extreme edges of the tapered wedge 20 when the same is drawn home, and will thus facilitate locking the parts together without however in any way reducing the effectiveness of the wedging action.

Similar notches or relieves 43 and 44 are also provided in the construction shown in Figs. 4 and 5 and if desired they might be provided in the other constructions.

While I have herein shown and described only certain embodiments of the features of my present invention still I do not intend to limit myself thereto except as I may do so in the claims.

I claim:

1. As a new article of manufacture, a pipe hanger and anchor for the purpose specified comprising in combination a collar member adapted to encircle and support a pipe element, and having substantially one half of its circular arc formed on a cylinder of radius substantially the same as that of the pipe element, and having its other and opposing portion formed of a larger size than the radius of pipe element, said larger sized portion tapering in size lengthwise of the collar member to thereby establish a semi-circular wedge shaped slotted opening between the collar member and the pipe element, the size of said opening tapering from a larger to a smaller dimension from one end of the collar member towards the other, a semi-circular wedge of tapered thickness having its concave surface substantially cylindrical and of substantially the same radius as the pipe element and adapted to seat squarely against the pipe element, and having its convex surface adapted to seat and wedge against the inner surface of the collar at the position of the tapered wedge shaped slotted opening aforesaid, there being longitudinally extending grooves or relieves at the lines of joinder of the slotted opening with the collar section of smaller radius, for the purpose specified, companion lugs extending outwardly from the collar and the wedge shaped element at the wedge ends of maximum dimension, and means for drawing said lug elements together to thereby forcefully wedge the wedge element into the tapered slotted opening, substantially as described.

2. As a new article of manufacture a pipe hanger and anchor for the purpose specified comprising in combination a collar member adapted to encircle and support a pipe element, and having substantially one half of its circular arc formed on a cylinder of radius substantially the same as that of the pipe element, and having its other and opposing portion formed of a larger size than the radius of pipe element, said larger sized portion tapering in size lengthwise of the collar member to thereby establish a semi-circular wedge shaped slotted opening between the collar member and the pipe element, the size of said opening tapering from a larger to a smaller dimension from one end of the collar member towards the other, a semi-circular wedge of tapered thickness having its concave surface substantially cylindrical and of substantially the same radius as the pipe element and adapted to seat squarely against the pipe element, and having its convex surface adapted to seat and wedge against the inner surface of the collar at the position of the tapered wedge shaped slotted opening aforesaid, companion lugs extending outwardly from the collar and the wedge shaped element at the wedge ends of maximum dimension, and means for drawing said lug elements together to thereby forcefully wedge the wedge element into the tapered slotted opening, substantially as described.

3. As a new article of manufacture a pipe hanger and anchor for the purpose specified comprising in combination a collar member adapted to encircle and support a pipe element, and having substantially one half of its circular arc formed on a cylinder of radius substantially the same as that of the pipe element, and having its other and opposing portion formed of a larger size than the radius of pipe element, said larger sized portion tapering in size lengthwise of the collar member to thereby establish a semi-circular wedge shaped slotted opening between the collar member and the pipe element, the size of said opening tapering from a larger to a smaller dimension from one end of the collar member towards the other, a semi-circular wedge of tapered thickness having its concave surface substantially cylindrical and of substantially the same radius as the pipe element and adapted to seat squarely against the pipe element, and having its convex surface adapted to seat and wedge against the inner surface of the collar at the position of the tapered wedge shaped slotted opening aforesaid, companion lugs extending outwardly from the collar and the wedge shaped element, and means for drawing said lug elements together to thereby forcefully wedge the wedge element into the tapered slotted opening, substantially as described.

4. As a new article of manufacture a pipe hanger and anchor for the purpose specified comprising in combination a collar member adapted to encircle and support a pipe element, and having substantially one half of its circular arc formed on a cylinder of radius substantially the same as that of the pipe element, and having its other and opposing portion formed of a larger size than the radius of pipe element, said larger sized portion tapering in size lengthwise of the collar member to thereby establish a semi-circular wedge shaped slotted opening between the collar member and the pipe element, the size of said opening tapering from a larger to a smaller dimension from one end of the collar member towards the other, a semi-circular wedge of tapered thickness having its concave surface substantially cylindrical and of substantially the same radius as the pipe element and adapted to seat squarely against the pipe element, and having its convex surface adapted to seat and wedge against the inner surface of the collar at the position of the tapered wedge shaped slotted opening aforesaid, and means for drawing the wedge element forcefully into the tapered slotted opening, substantially as described.

WILLIAM WRIGHT.